US011915036B2

United States Patent
Xie et al.

(10) Patent No.: US 11,915,036 B2
(45) Date of Patent: Feb. 27, 2024

(54) METHOD, SYSTEM, AND DEVICE FOR MODIFYING INTERNAL CONFIGURATION OF VIRTUAL MACHINE

(71) Applicant: INSPUR SUZHOU INTELLIGENT TECHNOLOGY CO., LTD., Jiangsu (CN)

(72) Inventors: Yan Xie, Jiangsu (CN); Weifeng Liu, Jiangsu (CN); Xuliang Guo, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/280,217

(22) PCT Filed: Jan. 26, 2022

(86) PCT No.: PCT/CN2022/074060
§ 371 (c)(1),
(2) Date: Sep. 2, 2023

(87) PCT Pub. No.: WO2023/010819
PCT Pub. Date: Feb. 9, 2023

(65) Prior Publication Data
US 2024/0036909 A1 Feb. 1, 2024

(30) Foreign Application Priority Data
Aug. 4, 2021 (CN) .......................... 202110888738.6

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4416* (2013.01); *H04L 41/046* (2013.01);
(Continued)

(58) Field of Classification Search
CPC ............... G06F 9/4416; G06F 9/45558; G06F 2009/45595; H04L 41/046; H04L 41/0895
See application file for complete search history.

(56) References Cited

U.S. PATENT DOCUMENTS 9,792,141 B1   10/2017  Sethuramalingam et al.
10,853,494 B2 * 12/2020  Subramanian .......... G06F 21/51
(Continued)

FOREIGN PATENT DOCUMENTS

CN   102257479 A   11/2011
CN   103491203 A   1/2014
(Continued)

OTHER PUBLICATIONS

Qiu et al. English translation of CN_103491203_A_I. (Year: 2014).*
(Continued)

*Primary Examiner* — John M MacIlwinen
(74) *Attorney, Agent, or Firm* — IPro, PLLC

(57) ABSTRACT

The present application discloses a method for modifying an internal configuration of a virtual machine, a system and a device, wherein the method is applied to a virtual machine installed with a proxy service therein, and the proxy service is configured for, after the proxy service itself is started up, sending a datum request to a preset IP address via a virtual network card corresponding to the virtual machine. The method includes, when there is a target virtual network card sending a datum request to the preset IP address, according to a predetermined corresponding relation between virtual network cards and virtual machines, determining a target virtual machine corresponding to the target virtual network
(Continued)

card; from a database, obtaining target configuration data corresponding to the target virtual machine.

20 Claims, 2 Drawing Sheets

(51) Int. Cl.
*H04L 41/046* (2022.01)
*H04L 41/0895* (2022.01)
*H04L 43/08* (2022.01)

(52) U.S. Cl.
CPC .......... *H04L 41/0895* (2022.05); *H04L 43/08* (2013.01); *G06F 2009/45595* (2013.01)

(56) References Cited

U.S. PATENT DOCUMENTS

| | | | |
|---|---|---|---|
| 2011/0022694 A1* | 1/2011 | Dalal | H04L 41/0856 718/1 |
| 2012/0110574 A1* | 5/2012 | Kumar | G06F 9/45558 718/1 |
| 2015/0339144 A1* | 11/2015 | Cao | G06F 9/45558 718/1 |
| 2020/0218558 A1 | 7/2020 | Ellore Sreenath et al. | |

FOREIGN PATENT DOCUMENTS

| | | |
|---|---|---|
| CN | 109558212 A | 4/2019 |
| CN | 109768871 A | 5/2019 |
| CN | 109933411 A | 6/2019 |
| CN | 113326104 A | 8/2021 |

OTHER PUBLICATIONS

Li et al. English translation of CN_109558212_A_I. (Year: 2019).*
Yu, H. English translation of CN_109768871_A_I. (Year: 2019).*
Niu et al. English translation of CN_109933411_A_I. (Year: 2019).*
Johnston, M. RFC 4578—"Dynamic Host Configuration Protocol (DHCP) Options for the Intel Preboot execution Environment (PXE)". (Year: 2006).*
Cruz, Tiago, et al. "Integration of PXE-based desktop solutions into broadband access networks." 2010 International Conference on Network and Service Management. IEEE. (Year: 2010).*
Droms, Ralph. "Automated configuration of TCP/IP with DHCP." IEEE Internet Computing 3.4: 45-53. (Year: 1999).*
Ziyu Chen. "Research on standardized configuration model of VM for private cloud." Operation and Support. Dec., 2019. doi: 10.11959/j.issn.1000 0801.2019138.
Pourghebleh, Behrouz, et al. "The importance of nature-inspired meta-heuristic algorithms for solving virtual machine consolidation problem in cloud environments." Cluster Computing 24.3 (2021): 2673-2696.

* cited by examiner

METHOD, SYSTEM, AND DEVICE FOR MODIFYING INTERNAL CONFIGURATION OF VIRTUAL MACHINE

CROSS REFERENCE TO RELEVANT APPLICATIONS

The present application claims the priority of the Chinese patent application filed on Aug. 4, 2021 before the Chinese Patent Office with the application number of CN202110888738.6 and the title of "METHOD, SYSTEM, AND DEVICE FOR MODIFYING INTERNAL CONFIGURATION OF VIRTUAL MACHINE", which is incorporated herein in its entirety by reference.

TECHNICAL FIELD

The present application relates to a method for modifying an internal configuration of a virtual machine, a system and a device.

BACKGROUND

In virtualized platforms, because the virtual machine and the mainframe are isolated, and the interior of the virtual machine cannot be manipulated directly by using the mainframe, a proxy service is installed in the virtual machine, for example, a vmtools (a virtual machine tool) service. The service receives instructions from the virtualized platform, and, according to the instructions, executes the corresponding operations in the virtual machine, whereby the virtualized platform may realize some functions of modifying the internal configuration of the virtual machine directly by using a managing interface.

When the virtual machine is in the shutting-down state, if the virtualized platform dispatches an instruction of modifying the internal configuration of the virtual machine, then, the virtual machine, when starting up, may create a process to periodically inquire the state of the vmtools service in the virtual machine, the purpose of which is to, after the vmtools service is started up and is operating, dispatch the instruction of modifying the internal configuration of the virtual machine to the vmtools service. However, the process created by the virtual machine has an overtime duration, and if the virtual machine has a low speed at the starting-up stage (for example, checking the magnetic disk), and the vmtools service is not started up and operated when the process is overtime, then the dispatching of the instruction to the vmtools service fails, which results in failure of the modification on the internal configuration of the virtual machine.

SUMMARY

An embodiment of the present application provides a method for modifying an internal configuration of a virtual machine, wherein the method is applied to the virtual machine installed with a proxy service therein, and the proxy service is configured for, after the proxy service itself is started up, sending a datum request to a preset internet protocol (IP) address via a virtual network card corresponding to the virtual machine in a system; and the method for modifying the internal configuration of the virtual machine includes:

when there is a target virtual network card sending the datum request to the preset IP address, according to a predetermined corresponding relation between virtual network cards and the virtual machines, determining a target virtual machine corresponding to the target virtual network card, wherein the target virtual network card is any one of the virtual network cards in the system;

from a database configured for storing configuration data of the virtual machines in the system, obtaining target configuration data corresponding to the target virtual machine; and sending a modifying instruction containing the target configuration data to a target proxy service corresponding to the target virtual machine, to cause the target proxy service to modify an internal configuration of the target virtual machine based on the target configuration data.

In one of the embodiments, the method for modifying the internal configuration of the virtual machine further includes:

after the target proxy service receives the modifying instruction, stopping the operation of the target proxy service of sending the datum request to the preset IP address via the target virtual network card.

In one of the embodiments, stopping the operation of the target proxy service of sending the datum request to the preset IP address via the target virtual network card includes:

creating a signal file for the target proxy service, to cause the target proxy service to, after the signal file is successfully created, stop sending the datum request to the preset IP address via the target virtual network card.

In one of the embodiments, the method for modifying the internal configuration of the virtual machine further includes:

detecting whether the target configuration data corresponding to the target virtual machine in the database changes; and when the target configuration data corresponding to the target virtual machine in the database change, deleting the signal file, to cause the target proxy service to, after the signal file is successfully deleted, send again the datum request to the preset IP address via the target virtual network card.

In one of the embodiments, when there is the target virtual network card sending the datum request to the preset IP address, according to the predetermined corresponding relation between the virtual network cards and the virtual machines, determining the target virtual machine corresponding to the target virtual network card, and, from the database configured for storing the configuration data of the virtual machines in the system, obtaining the target configuration data corresponding to the target virtual machine includes:

when there is the target virtual network card sending the datum request to the preset IP address, inquiring a target media access control (MAC) address of the target virtual network card;

according to a predetermined corresponding relation between MAC addresses and a virtual machine identity documents (IDs), determining a target virtual machine ID corresponding to the target MAC address; and according to the target virtual machine ID, from the database configured for storing the configuration data of the virtual machines in the system, obtaining the target configuration data corresponding to the target virtual machine.

In one of the embodiments, the method for modifying the internal configuration of the virtual machine further includes:

ordering available IP addresses in the system according to utilization ratios; and regarding the IP address having a lowest utilization ratio as the preset IP address to which the proxy service sends the datum request.

An embodiment of the present application further provides a system for modifying an internal configuration of a virtual machine, wherein the system is applied to the virtual machine installed with a proxy service therein, and the proxy service is configured for, after the proxy service itself is started up, sending a datum request to a preset IP address via a virtual network card corresponding to the virtual machine in the system; and the system includes:

a determining module configured for, when there is a target virtual network card sending a datum request to the preset IP address, according to a predetermined corresponding relation between virtual network cards and the virtual machines, determining a target virtual machine corresponding to the target virtual network card, wherein the target virtual network card is any one of the virtual network cards in the system;

an obtaining module configured for, from a database configured for storing configuration data of the virtual machines in the system, obtaining target configuration data corresponding to the target virtual machine; and a modifying module configured for sending a modifying instruction containing the target configuration data to a target proxy service corresponding to the target virtual machine, to cause the target proxy service to modify an internal configuration of the target virtual machine based on the target configuration data.

In one of the embodiments, the system for modifying the internal configuration of the virtual machine further includes:

a stopping module configured for, after the target proxy service receives the modifying instruction, stopping the operation of the target proxy service of sending the datum request to the preset IP address via the target virtual network card.

In one of the embodiments, the determining module is further configured for ordering available IP addresses in the system according to utilization ratios, and regarding the IP address having a lowest utilization ratio as the preset IP address to which the proxy service sends the datum request.

An embodiment of the present application further provides a device for modifying the internal configuration of the virtual machine, wherein the device includes:

a memory configured for storing a computer-readable instruction; and a processor configured for, when executing the computer-readable instruction, implementing the steps of the method for modifying the internal configuration of the virtual machine according to any one of the above embodiments.

BRIEF DESCRIPTION OF THE DRAWINGS

In order to more clearly illustrate the technical solutions of the embodiments of the present application, the figures that are required to describe the prior art and the embodiments may be briefly described below. Apparently, the figures that are described below are merely some embodiments of the present application, and a person skilled in the art may obtain other figures according to these figures without paying creative work.

DETAILED DESCRIPTION

In order to make the technical solutions and the advantages of the embodiments of the present application clearer, the technical solutions according to the embodiments of the present application may be clearly and completely described below with reference to the drawings according to the embodiments of the present application. Apparently, the described embodiments are merely a part of embodiments of the present application, rather than all of the embodiments. All of the other embodiments that a person skilled in the art obtains on the basis of the embodiments of the present application without paying creative work fall within the protection scope of the present application.

Figure 1:
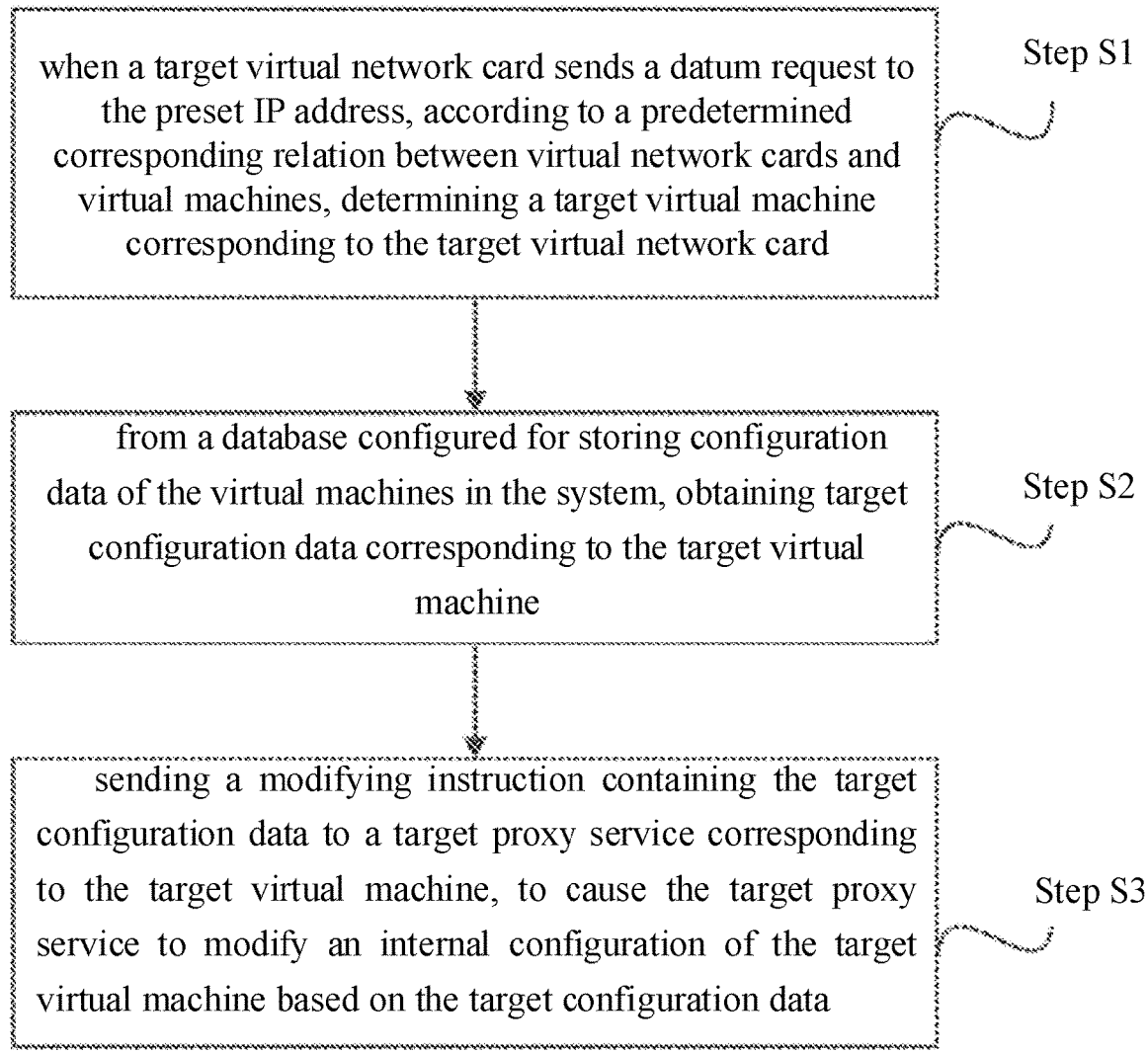
FIG. 1 is a flow chart of a method for modifying an internal configuration of a virtual machine according to one or more embodiments.

Referring to FIG. 1, FIG. 1 is a flow chart of a method for modifying an internal configuration of a virtual machine according to an embodiment of the present application.

The method for modifying the internal configuration of the virtual machine is applied to the virtual machine installed with a proxy service therein, and the proxy service is configured for, after the proxy service itself is started up, sending a datum request to a preset internet protocol (IP) address via a virtual network card corresponding to the virtual machine in a system. The method for modifying the internal configuration of the virtual machine includes:

Step S1: when there is a target virtual network card sending a datum request to the preset IP address, according to a predetermined corresponding relation between virtual network cards and virtual machines, determining a target virtual machine corresponding to the target virtual network card.

Specifically, in the system there are a plurality of virtual machines, and each of the virtual machines is installed with a proxy service (for example, a vmtools service) therein. The plurality of virtual machines and a plurality of virtual network cards in the system have a one-to-one corresponding relation. The proxy service in each of the virtual machines, after the proxy service itself is started up, actively sends a datum request to a preset internet protocol (IP) address via the virtual network card corresponding to the virtual machine where it is located. The step S1 may include: in response to a target virtual network card sending a datum request to the preset IP address, according to the predetermined correspondence relation between the virtual network cards and the virtual machines, determining a target virtual machine corresponding to the target virtual network card.

Based on that, by monitoring all of the virtual network cards in the system, whether there is the virtual network card sending the datum request to the preset IP address is determined, and when a target virtual network card (any one of the virtual network cards in the system) sends a datum request to the preset IP address, according to the predetermined corresponding relation between the virtual network cards and the virtual machine, a target virtual machine corresponding to the target virtual network card is determined. Step S2: from a database configured for storing configuration data of the virtual machines in the system, obtaining target configuration data corresponding to the target virtual machine.

Specifically, the database of the system stores the configuration data of the virtual machines in the system. Therefore, the target configuration data corresponding to the target virtual machine may be obtained from the database, to be used for the subsequent modification on the internal configuration of the target virtual machine.

Further specifically, the configuration data stored in the database may be of the j son format (JavaScript Object Notation, which is a lightweight data exchange format), for example, {"user": "inspur", "passwd": "123456"}, to facilitate the data processing.

Step S3: sending a modifying instruction containing the target configuration data to a target proxy service corresponding to the target virtual machine, to cause the target proxy service to modify an internal configuration of the target virtual machine based on the target configuration data.

Specifically, after the target configuration data corresponding to the target virtual machine is obtained, a modifying instruction containing the target configuration data is sent to a target proxy service corresponding to the target virtual machine. The target proxy service, after receiving the modifying instruction containing the target configuration data, modifies the internal configuration of the target virtual machine based on the target configuration data. Specifically the internal configuration of the target virtual machine may be modified by invoking a target proxy service interface.

In the method for modifying the internal configuration of the virtual machine according to the embodiment of the present application, the proxy service does not passively wait for the instruction as a passive part, but actively requests data as an active part. The system, when the proxy service actively requests data, dispatches the corresponding data to the proxy service. When the proxy service may actively request data, that indicates that the proxy service is normally operating, which may prevent the problem of failure in the modification on the internal configuration of the virtual machine caused by overtime of the starting-up of the proxy service.

In some embodiments, the method for modifying the internal configuration of the virtual machine further includes:

after the target proxy service receives the modifying instruction, stopping the operation of the target proxy service of sending the datum request to the preset IP address via the target virtual network card.

After the target proxy service receives the modifying instruction, the operation of the target proxy service of sending the datum request to the preset IP address via the target virtual network card is stopped, it may be prevented that the target proxy service repeatedly modifies the internal configuration of the target virtual machine.

In some embodiments, stopping the operation of the target proxy service of sending the datum request to the preset IP address via the target virtual network card includes:

creating a signal file for the target proxy service, to cause the target proxy service to, after the signal file is successfully created, stop sending the datum request to the preset IP address via the target virtual network card.

Specifically, creating a signal file for the target proxy service may be regarded as the mark of the target proxy service stopping sending the datum request to the preset IP address via the target virtual network card. In other words, in the embodiments of the present application, after the target proxy service receives the modifying instruction, a signal file for the target proxy service is created (the signal file may also be generated automatically after the target proxy service receives the modifying instruction), and the target proxy service, after the signal file is successfully created, stops sending the datum request to the preset IP address via the target virtual network card.

In some embodiments, the method for modifying the internal configuration of the virtual machine further includes:

detecting whether the target configuration data corresponding to the target virtual machine in the database change; and when the target configuration data corresponding to the target virtual machine in the database change, deleting the signal file, to cause the target proxy service to, after the signal file is successfully deleted, send again the datum request to the preset IP address via the target virtual network card.

Taking into consideration that the configuration data corresponding to the virtual machines in the database might change, at this moment, it is necessary to modify again the internal configurations of the virtual machines, it may be detected whether the target configuration data corresponding to the target virtual machine in the database change. If the target configuration data corresponding to the target virtual machine in the database change, then the signal file created for the target proxy service corresponding to the target virtual machine is deleted, and the target proxy service, after the signal file is successfully deleted, sends again the datum request to the preset IP address via the target virtual network card. If the target configuration data corresponding to the target virtual machine in the database do not change, that indicates that it is not necessary to modify again the internal configuration of the target virtual machine, and therefore the signal file created for the target proxy service corresponding to the target virtual machine is maintained. It should be noted that the proxy service in the virtual machine may always be in the operating state, and may process the configuration data at any time.

Specifically, the method for modifying the internal configuration of the virtual machine may include: detecting whether the target configuration data corresponding to the target virtual machine in the database change; and in response to the target configuration data corresponding to the target virtual machine in the database change, deleting the signal file, to cause the target proxy service to, after the signal file is successfully deleted, send again the datum request to the preset IP address via the target virtual network card.

In some embodiments, when there is the target virtual network card sending the datum request to the preset IP address, according to the predetermined corresponding relation between the virtual network cards and the virtual machines, determining the target virtual machine corresponding to the target virtual network card, and, from the database configured for storing the configuration data of the virtual machines in the system, obtaining the target configuration data corresponding to the target virtual machine includes:

when there is the target virtual network card sending the datum request to the preset IP address, inquiring a target media access control (MAC) address of the target virtual network card;

according to a predetermined corresponding relation between MAC addresses and virtual machine identity documents, determining a target virtual machine ID corresponding to the target MAC address; and according to the target virtual machine ID, from the database configured for storing the configuration data of the virtual machines in the system, obtaining the target configuration data corresponding to the target virtual machine.

Specifically, the corresponding relation between the virtual network cards and the virtual machines according to the embodiment of the present application is specifically expressed as the corresponding relation between the media access control (MAC) addresses of the virtual network cards and the virtual machine identity documents (IDs). The different virtual network cards have different MAC addresses, and the MAC addresses may be used for identifying the virtual network cards. Based on that, the step includes, when there is a target virtual network card sending a datum request to the preset IP address, firstly inquiring a target MAC address of the target virtual network card, and, subsequently, according to a predetermined corresponding relation between the MAC addresses and the virtual machine IDs, determining a target virtual machine ID corresponding to the target MAC address; thus, according to the target virtual machine ID, from the database, obtaining target configuration data corresponding to the target virtual machine.

In some embodiments, when there is the target virtual network card sending the datum request to the preset IP address, inquiring the target MAC address of the target virtual network card includes: in response to a target virtual network card sending a datum request to the preset IP address, inquiring a target MAC address of the target virtual network card.

In some embodiments, the step of presetting the preset IP address includes:
ordering available IP addresses in the system according to utilization ratios; and
regarding the IP address having a lowest utilization ratio as an IP address to which the proxy service sends the datum request.

In some embodiments, the method for modifying the internal configuration of the virtual machine further includes: ordering available IP addresses in the system according to utilization ratios; and regarding the IP address having a lowest utilization ratio as the preset IP address to which the proxy service sends the datum request.

In order to prevent conflict in the usage of the IP addresses, the IP address having the lowest utilization ratio among the available IP addresses in the system is used as the preset IP address to which the proxy service sends the datum request. For example, in some cases, the IP address 169.254.169.254, which is substantially not used, is used as the preset IP address to which the proxy service sends the datum request. Based on that, firstly available IP addresses in the system according to utilization ratios are ordered, and obtaining IP address having the lowest utilization ratio is equivalent to obtain the preset IP address to which the proxy service sends the datum request.

In conclusion, the proxy service in the virtual machine and the mainframe where the virtual machine is located complete the process of active datum requesting and passive datum receiving together, which solves the problem that conventional proxy services may merely passively receive data, and, by creating and deleting of the signal file, the function of flexibly modifying the internal configuration of the virtual machine is realized.

Figure 2:
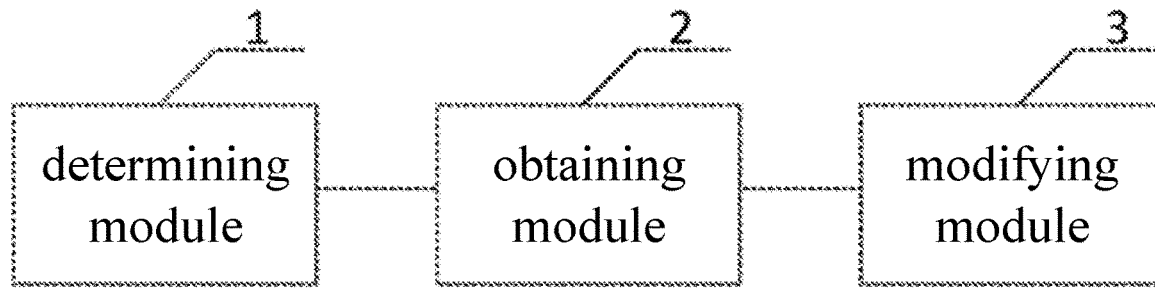
FIG. 2 is a schematic structural diagram of a system for modifying an internal configuration of a virtual machine according to one or more embodiments.

Referring to FIG. 2, FIG. 2 is a schematic structural diagram of a system for modifying an internal configuration of a virtual machine according to an embodiment of the present application.

The system for modifying the internal configuration of the virtual machine is applied to the virtual machine installed with a proxy service therein, and the proxy service is configured for, after the proxy service itself is started up, sending a datum request to a preset IP address via a virtual network card corresponding to the virtual machine in the system. The system for modifying the internal configuration of the virtual machine includes:
a determining module 1 configured for, when there is a target virtual network card sending a datum request to the preset IP address, according to a predetermined corresponding relation between virtual network cards and virtual machines, determining a target virtual machine corresponding to the target virtual network card, wherein the target virtual network card is any one of the virtual network cards in the system;
an obtaining module 2 configured for, from a database configured for storing configuration data of the virtual machines in the system, obtaining target configuration data corresponding to the target virtual machine; and
a modifying module 3 configured for sending a modifying instruction containing the target configuration data to a target proxy service corresponding to the target virtual machine, to cause the target proxy service to modify an internal configuration of the target virtual machine based on the target configuration data.

In some embodiments, the determining module 1 is configured for, in response to the target virtual network card sending the datum request to the preset IP address, according to the predetermined corresponding relation between the virtual network cards and the virtual machines, determining a target virtual machine corresponding to the target virtual network card.

In some embodiments, the system for modifying the internal configuration of the virtual machine further includes:
a stopping module configured for, after the target proxy service receives the modifying instruction, stopping the operation of the target proxy service of sending the datum request to the preset IP address via the target virtual network card.

In some embodiments, the stopping module is configured for, in response to the target proxy service receiving the modifying instruction, stopping the operation of the target proxy service of sending the datum request to the preset IP address via the target virtual network card.

In some embodiments, the operation of presetting the preset IP address includes:
ordering available IP addresses in the system according to utilization ratios; and
regarding the IP address having a lowest utilization ratio as the preset IP address to which the proxy service sends the datum request.

In some embodiments, the determining module is further configured for ordering available IP addresses in the system according to utilization ratios, and regarding the IP address having a lowest utilization ratio as the preset IP address to which the proxy service sends the datum request.

Further details of the system for modifying the internal configuration of the virtual machine may refer to the steps of the method for modifying the internal configuration of the virtual machine according to any one of the above embodiments, and are not discussed further herein.

The modules of the system for modifying the internal configuration of the virtual machine may be implemented entirely or partially by software, hardware and a combination thereof. The modules may be embedded into or independent of a processor in a computer device in the form of hardware, and may also be stored in a memory in a computer device in the form of software, to facilitate the processor to invoke and execute the operations corresponding to the modules.

In some embodiments, an embodiment of the present application further provides a device for modifying the internal configuration of the virtual machine, wherein the device includes:

a memory configured for storing a computer-readable instruction; and a processor configured for, when executing the computer-readable instruction, implementing the steps of the method for modifying the internal configuration of the virtual machine according to any one of the above embodiments.

Figure 3:
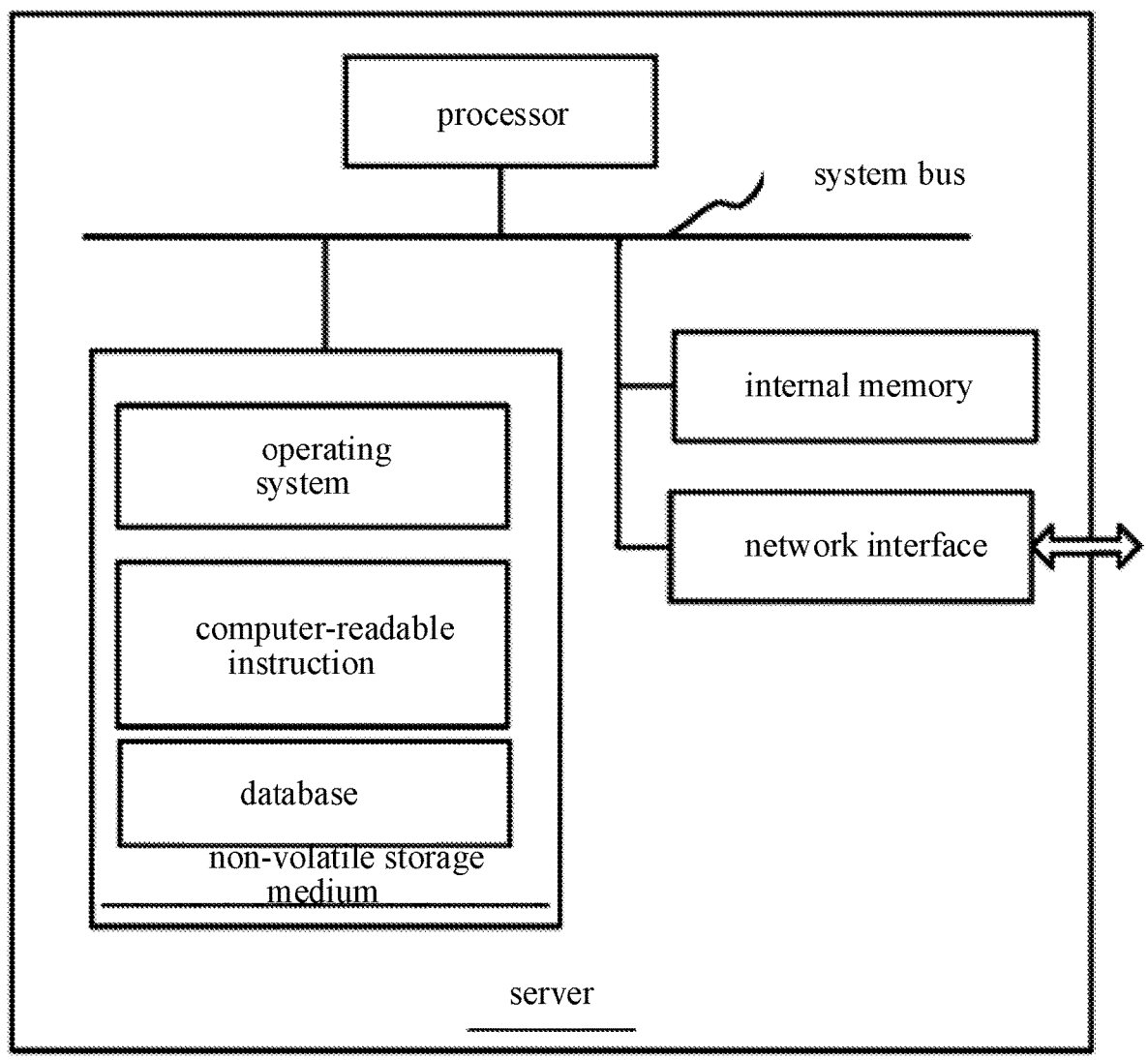
FIG. 3 is an internal structural diagram of a device for modifying an internal configuration of a virtual machine according to one or more embodiments.

The device for modifying the internal configuration of the virtual machine according to the embodiment of the present application may be a server, and its internal structural diagram may be shown in FIG. 3. The device for modifying the internal configuration of the virtual machine includes a processor, a memory, a network interface and a database that are connected by a system bus. The processor is used for providing the capacity of calculation and controlling. The memory includes a non-volatile storage medium and an internal memory. The non-volatile storage medium stores an operating system, a computer program and a database. The internal memory provides the environment for the running of the operating system and the computer-readable instruction in the non-volatile storage medium. The database may be used for storing the target configuration data corresponding to the target virtual machine and so on. The network interface is used for communicating with an external terminal via a network connection. The computer-readable instruction, when executed by a processor, implements the steps of the method for modifying the internal configuration of the virtual machine according to any one of the above embodiments.

Further details of the device for modifying the internal configuration of the virtual machine may refer to the steps of the method for modifying the internal configuration of the virtual machine according to any one of the above embodiments, and are not discussed further herein.

It should also be noted that, in the specification, the terms "include", "contain" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Without further limitation, an element defined by the wording "including a . . . " does not exclude additional same element in the process, method, article or device including the element.

The above description on the disclosed embodiments enables a person skilled in the art to implement or use the embodiments of the present application. Various modifications on those embodiments may be apparent to a person skilled in the art, and the general principle defined herein may be implemented in other embodiments without departing from the spirit or scope of the present application. Therefore, the present application should not be limited to the embodiments illustrated herein, but should meet the broadest scope in accord with the principle and the novel characteristics disclosed herein.

The invention claimed is:

1. A method for modifying an internal configuration of a virtual machine, wherein the method is applied to the virtual machine installed with a proxy service therein, and the proxy service is configured for, after the proxy service itself is started up, sending a datum request to a preset internet protocol (IP) address via a virtual network card corresponding to the virtual machine in a system; and the method for modifying the internal configuration of the virtual machine comprises:

when there is a target virtual network card sending the datum request to the preset IP address, according to a predetermined corresponding relation between virtual network cards and virtual machines, determining a target virtual machine corresponding to the target virtual network card, wherein the target virtual network card is any one of the virtual network cards in the system;

from a database configured for storing configuration data of the virtual machines in the system, obtaining target configuration data corresponding to the target virtual machine; and sending a modifying instruction containing the target configuration data to a target proxy service corresponding to the target virtual machine, to cause the target proxy service to modify an internal configuration of the target virtual machine based on the target configuration data.

2. The method for modifying the internal configuration of the virtual machine according to claim 1, wherein the method further comprises:

after the target proxy service receives the modifying instruction, stopping the operation of the target proxy service of sending the datum request to the preset IP address via the target virtual network card.

3. The method for modifying the internal configuration of the virtual machine according to claim 2, wherein stopping the operation of the target proxy service of sending the datum request to the preset IP address via the target virtual network card comprises:

creating a signal file for the target proxy service, to cause the target proxy service to, after the signal file is successfully created, stop sending the datum request to the preset IP address via the target virtual network card.

4. The method for modifying the internal configuration of the virtual machine according to claim 3, wherein the method further comprises:

detecting whether the target configuration data corresponding to the target virtual machine in the database change; and when the target configuration data corresponding to the target virtual machine in the database change, deleting the signal file, to cause the target proxy service to, after the signal file is successfully deleted, send again the datum request to the preset IP address via the target virtual network card.

5. The method for modifying the internal configuration of the virtual machine according to claim 3, wherein creating the signal file for the target proxy service is regarded as a mark of the target proxy service stopping sending the datum request to the preset IP address via the target virtual network card.

6. The method for modifying the internal configuration of the virtual machine according to claim 1, wherein when there is the target virtual network card sending the datum request to the preset IP address, according to the predetermined corresponding relation between the virtual network cards and the virtual machines, determining the target virtual machine corresponding to the target virtual network card, and, from the database configured for storing the configuration data of the virtual machines in the system, obtaining the target configuration data corresponding to the target virtual machine comprises:

when there is the target virtual network card sending the datum request to the preset IP address, inquiring a target media access control (MAC) address of the target virtual network card;

according to a predetermined corresponding relation between MAC addresses and virtual machine identity documents (IDs), determining a target virtual machine ID corresponding to the target MAC address; and according to the target virtual machine ID, from the database configured for storing the configuration data of the virtual machines in the system, obtaining the target configuration data corresponding to the target virtual machine.

7. The method for modifying the internal configuration of the virtual machine according to claim 1, wherein the method further comprises:

ordering available IP addresses in the system according to utilization ratios; and regarding the IP address having a lowest utilization ratio as the preset IP address to which the proxy service sends the datum request.

8. A device for modifying the internal configuration of the virtual machine, wherein the device comprises:

a memory configured for storing a computer-readable instruction; and a processor configured for, when executing the computer-readable instruction, implementing the steps of the method for modifying the internal configuration of the virtual machine according to claim 1.

9. The device for modifying the internal configuration of the virtual machine according to claim 8, wherein the method further comprises:

after the target proxy service receives the modifying instruction, stopping the operation of the target proxy service of sending the datum request to the preset IP address via the target virtual network card.

10. The device for modifying the internal configuration of the virtual machine according to claim 9, wherein stopping the operation of the target proxy service of sending the datum request to the preset IP address via the target virtual network card comprises:

creating a signal file for the target proxy service, to cause the target proxy service to, after the signal file is successfully created, stop sending the datum request to the preset IP address via the target virtual network card.

11. The device for modifying the internal configuration of the virtual machine according to claim 10, wherein the method further comprises:

detecting whether the target configuration data corresponding to the target virtual machine in the database change; and when the target configuration data corresponding to the target virtual machine in the database change, deleting the signal file, to cause the target proxy service to, after the signal file is successfully deleted, send again the datum request to the preset IP address via the target virtual network card.

12. The device for modifying the internal configuration of the virtual machine according to claim 10, wherein creating the signal file for the target proxy service is regarded as a mark of the target proxy service stopping sending the datum request to the preset IP address via the target virtual network card.

13. The device for modifying the internal configuration of the virtual machine according to claim 8, wherein when there is the target virtual network card sending the datum request to the preset IP address, according to the predetermined corresponding relation between the virtual network cards and the virtual machines, determining the target virtual machine corresponding to the target virtual network card, and, from the database configured for storing the configuration data of the virtual machines in the system, obtaining the target configuration data corresponding to the target virtual machine comprises:

when there is the target virtual network card sending the datum request to the preset IP address, inquiring a target MAC address of the target virtual network card;

according to a predetermined corresponding relation between MAC addresses and virtual machine IDs, determining a target virtual machine ID corresponding to the target MAC address; and according to the target virtual machine ID, from the database configured for storing the configuration data of the virtual machines in the system, obtaining the target configuration data corresponding to the target virtual machine.

14. The device for modifying the internal configuration of the virtual machine according to claim 8, wherein the method further comprises:

ordering available IP addresses in the system according to utilization ratios; and regarding the IP address having a lowest utilization ratio as the preset IP address to which the proxy service sends the datum request.

15. The device for modifying the internal configuration of the virtual machine according to claim 8, wherein before when there is the target virtual network card sending the datum request to the preset IP address, according to the predetermined corresponding relation between virtual network cards and virtual machines, determining the target virtual machine corresponding to the target virtual network card, the method further comprises:

by monitoring all of the virtual network cards in the system, determining whether there is the virtual network card sending the datum request to the preset IP address.

16. The device for modifying the internal configuration of the virtual machine according to claim 8, wherein sending the modifying instruction containing the target configuration data to the target proxy service corresponding to the target virtual machine, to cause the target proxy service to modify the internal configuration of the target virtual machine based on the target configuration data comprises:

modifying the internal configuration of the target virtual machine by invoking a target proxy service interface.

17. The device for modifying the internal configuration of the virtual machine according to claim 8, wherein the virtual machine stays in the operating state continuously and is capable of processing the configuration data at any time.

18. The method for modifying the internal configuration of the virtual machine according to claim 1, wherein before when there is the target virtual network card sending the datum request to the preset IP address, according to the predetermined corresponding relation between virtual network cards and virtual machines, determining the target virtual machine corresponding to the target virtual network card, the method further comprises:

by monitoring all of the virtual network cards in the system, determining whether there is the virtual network card sending the datum request to the preset IP address.

19. The method for modifying the internal configuration of the virtual machine according to claim 1, wherein sending the modifying instruction containing the target configuration data to the target proxy service corresponding to the target virtual machine, to cause the target proxy service to modify the internal configuration of the target virtual machine based on the target configuration data comprises:

modifying the internal configuration of the target virtual machine by invoking a target proxy service interface.

20. The method for modifying the internal configuration of the virtual machine according to claim 1, wherein the virtual machine stays in the operating state continuously and is capable of processing the configuration data at any time.

* * * * *